United States Patent

Nishi

[11] 4,398,368
[45] Aug. 16, 1983

[54] FISH CATCHER

[76] Inventor: Chikao Nishi, 6-12, Kaorigaoka 3-cho, Sakai-shi, Osaka-fu, Japan

[21] Appl. No.: 261,053

[22] Filed: May 6, 1981

[30] Foreign Application Priority Data

May 8, 1980 [JP] Japan .................................. 55/61409

[51] Int. Cl.³ .............................................. A01K 97/12
[52] U.S. Cl. ......................................................... 43/15
[58] Field of Search ............................................. 43/15

[56] References Cited

U.S. PATENT DOCUMENTS

| | | | |
|---|---|---|---|
| 2,824,403 | 9/1955 | Booth | 43/15 |
| 2,898,696 | 8/1959 | Bolland | 43/15 |
| 3,470,646 | 11/1967 | Erkkila | 43/15 |
| 4,141,168 | 2/1979 | Nishi | 43/15 |

Primary Examiner—Nicholas P. Godici
Assistant Examiner—Richard K. Seidel
Attorney, Agent, or Firm—Koda and Androlia

[57] ABSTRACT

A fish catcher comprising, an elastic bent rod, a center rod mounted on said bent rod and connected to said bent rod at its lower end, an inward engagement rod pivotally connected to the other end of said bent rod, said engagement rod having a hook ring at its end, a bracket extending from said center rod to be secured to said engagement rod, a swing maker swingably provided on said bracket, said maker having a guide ring at its end to be engaged with said engagement rod and an engagement edge at the other end thereof, a hook provided downwardly on said bracket, an inward ring formed directly below said hook of said center rod, a float provided loosely around said center rod, and a hook line connected to said inward engagement rod and to pass through said inward ring. By thus contructing, a hook line will be automatically and resiliently drawn so that a fish would be kept hooked.

5 Claims, 8 Drawing Figures

FISH CATCHER

BACKGROUND OF THE INVENTION

1. Field of the Invention

This invention relates to a fish catcher mounted at the end of a fishing line and more particularly to improvements in a fish catcher which is made of a bent rod which is designed to draw a hook line automatically and resiliently upward when a fish snaps at the bait of a fishing hook at the end of the hook line suspended from one end of the bent rod.

2. Description of the Prior Art

The present inventor already proposed a fish catcher of the structure substantially described above in Japanese Patent Publication No. 69187/1978 (U.S. Pat. No. 4,141,168), and the present invention is an improvement over the this prior art.

In the prior art, identified above, when a hook is brought into elastic engagement with a hook ring and a catcher is set ready for action, the elastic engagement is effected either by drawing a hook line downward with both finger tips of one hand and during the time placing fingers of another hand in the position in which to help bring both the hook and ring into engagement and then by engaging the hook with the ring or by drawing a leg rod and a leg rod close to each other with fingers of both hands in the direction of engagement. The fact, however, is that the manipulation for engagement described above is exceedingly cumbersome at a fishing place where the angler is exposed to wind, rain and snow and finds it difficult to handle a fishing tackle, and particularly in winter time the angler finds it difficult to manipulate the tackle because his fingers become stiff with cold.

When the catcher is cast into the water after completion of the elastic engagement of the hook and ring of the catcher, it sometimes happens that the collision of the catcher with the water surface, subjection thereof to underwater current or catching thereof by rocks and reefs tends to disengage the engaged catcher before a fish snaps at the bait of the catcher, bringing the intended fishing to failure.

SUMMARY OF THE INVENTION

Accordingly, it is an object of the present invention to eliminate the above drawbacks.

According to the present invention, a hook and a hook ring are brought into definite engagement by mere operation of drawing down the hook line by fingers of one hand and it is not at all necessary to draw the hook and the hook ring close to each other at their positions of engagement by fingers or to ascertain the engagement of the hook and the hook ring visually, and the engagement of them can reliably be effected by the above operation in a blind manner. Also, the catcher at the present invention is so designed as to be in readiness for operation in such a manner that the disengagement of the hook from the hook ring is not effected after the engagement thereof before the catcher has been sunk under the water, and only when the catcher is subjected to the buoyance of the water, the hook is disengaged from the hook ring. According to the means which the invention employs for achieving the operation above, a center rod is passed through the middle of bent rod and a swing maker cooperating with a float is mounted on the center rod so as to make the float function as a guide which controls the swing of the swing maker before the catcher is subjected to the buoyancy of the water and which brings the hook into engagement with the hook ring and on the other hand a means is employed to make it reliable to effect elastic engagement by making the float move afloat away from the swing maker after the catcher has been subjected to the buoyancy of the eater and drawing a hook line downward at the time of jerking by a fish. The feature of the invention that makes it possible to provide a reliable elastic engagement before the elastically engaged hook and hook ring are sunk under the water renders the catcher of the invention adaptive for use also in surf-fishing in which a relatively strong force is applied to the end of the fishing line.

A detailed description of a preferred embodiment of the invention will now be given with reference to the accompanying drawings in which like reference characters are used for denoting like elements.

DETAILED DESCRIPTION OF THE INVENTION

Figure 1:
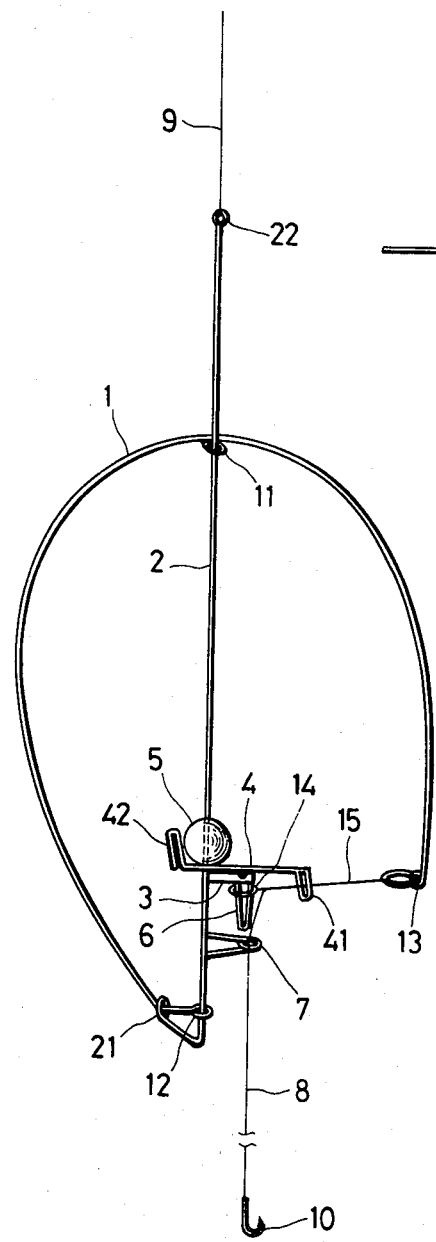
FIG. 1 is a front view showing an embodiment of the fish catcher of the present invention set in a ready-to-operate position.
Figure 2:
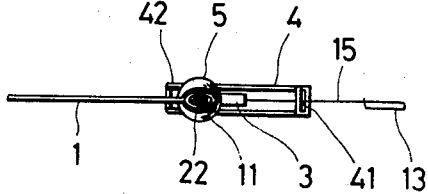
FIG. 2 is a plan view of FIG. 1.
Figure 5:
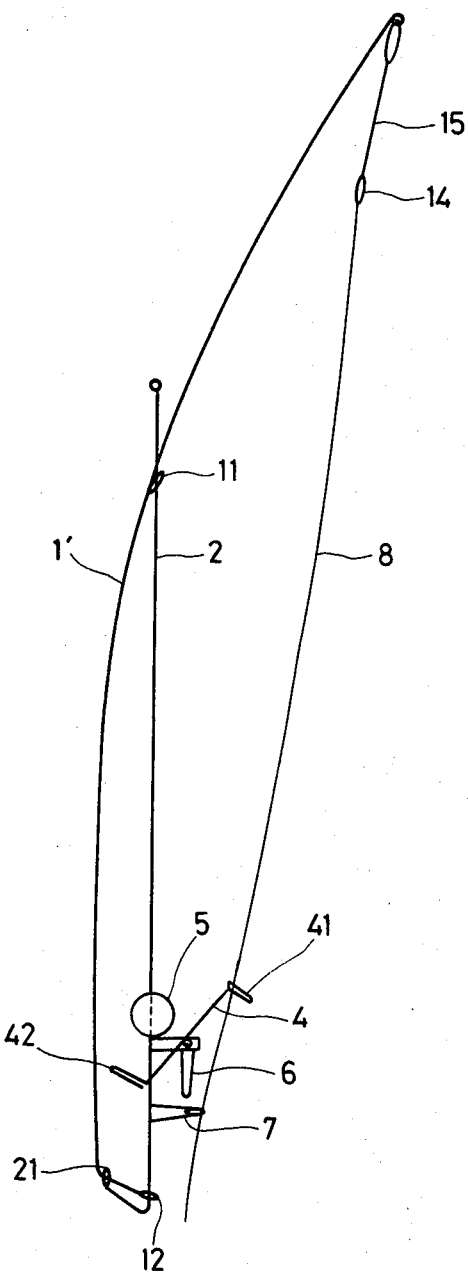
FIG. 5 is a front view showing a state of elastic disengagement of the hook ring from the hook.

In the drawings, the numeral 1 designates a bent rod obtained by bending a relatively thin elastic material e.g., a stainless steel wire, within its elastic limit and is designed to provide substantially an arcuate form by the elastic engagement (to be described later) of a hook ring 14 with a hook 6. The numeral 2 designates a center rod inserted longitudinally slideably into an eyelet 11 formed in substantially the middle of the upper portion of the bent rod 1 and into an eyelet 12 formed at one end of the bent rod 1. To the other end of the bent rod 1 is pivotally connected through an eyelet 13 an inward engagement rod 15 having a hook ring 14 at its end. In the middle of the center rod 2 is provided a bracket 3 slightly projecting toward the inward engagement rod 15 side, and on the bracket 3 is swingably attached a swing maker 4 which is equipped on the inward engagement rod 15 side with a guide ring 41 designed to loosely insert the hook ring 14 therethrough and on the opposite side with an engagement edge 42 engageable with a float 5. A hook 6 extending downwardly from the bracket 3 is provided below the swing maker 4 and immediately below the hook 6 is provided an inward ring 7 extending from the center rod 2. A float 5 is slidably passed through on the center rod 2 and, as shown in FIG. 1, when the float 5 is in its lowermost position, the float 5 is on the swing maker 4 and with respect to the force to swing the swing maker 4 to the right in the drawings, the float 5 prevents the swing maker 4 from swinging further by the engagement of the float 5 and the edge 42 of the swing maker 4, but when the float 5 moves upward afloat along the center rod 2 under the buoyance of the water, the swing maker 4 is allowed to be swung to the right in the drawings. The lower end of the rod 2 is bent outwardly to form an eyelet 21 at the end and loosely receives one end of the bent rod 1 into the eyelet 21 and is adapted to bring the rod 1 into substantially parallel relation with the center rod 2 when the rod 1 is brought into a straightforward position (referred to as a linear rod 1') as shown in FIG. 5 by cooperation of the eyelet 11 with the eyelet 12. A hook line 8 is suspended from the base side of the hook ring 14 through a guide ring 41 and the inward ring 7. To the top of the center rod 2 is attached a fishing line 9 through an eyelet 22.

Figure 4:
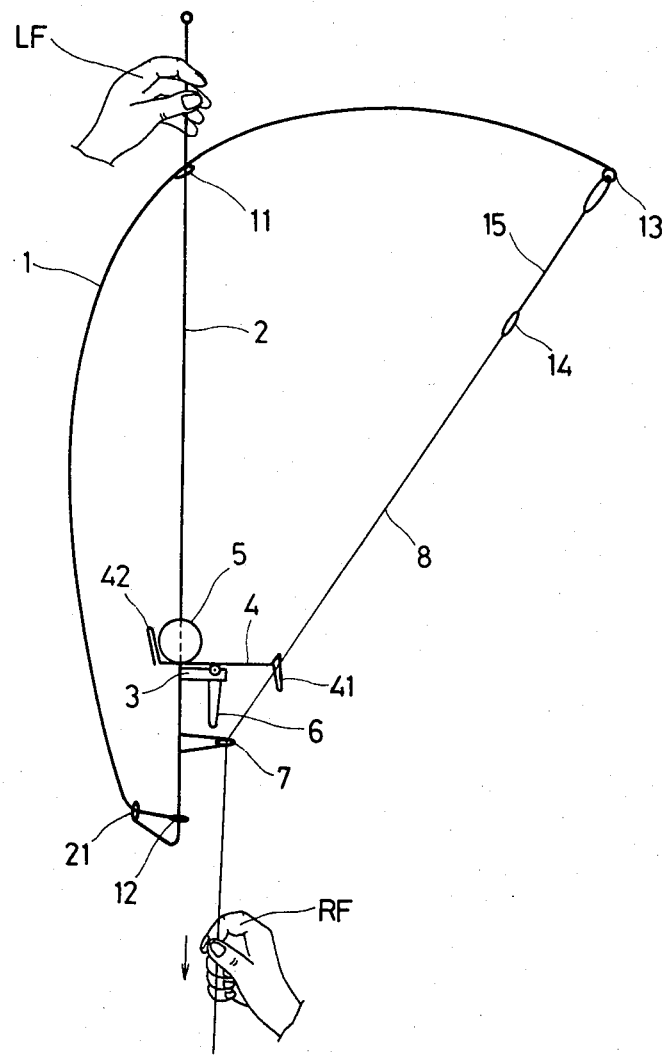
FIGS. 4A and 4B are an illustration showing the course of engagement of a hook ring with a hook.
FIGS. 4C and 4D are an illustration showing the course of disengagement of the hook ring from the hook by a jerk of a fish.
Figure 4:
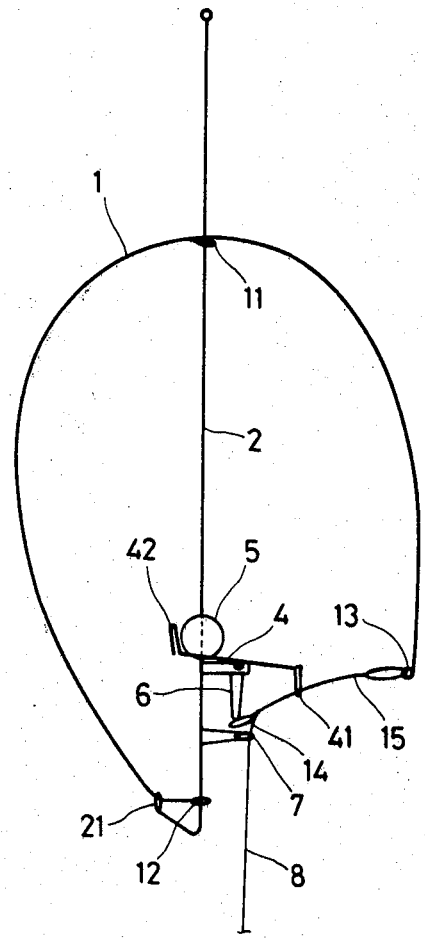

A description will be given of how the fish catcher of the present invention is used and of the operating principle of the fish catcher. Before the catcher is used, the linear rod 1' and the center rod 2 are maintained in substantially parallel relation between the eyelet 11 and the eyelet 12 as shown in FIG. 5. In setting the catcher ready for operation as shown in FIG. 4(A), a portion between the eyelets 11 and 12 of the rod is gripped by the fingers LF of one hand and the hook line 8 is drawn downward by fingers RF of another hand in the state of the float 5 being placed on the swing maker 4. Then, the rod 1' is resiliently bent into an arc to provide the bent rod 1, and the inward bent rod 15 is drawn in the direction of the guide ring 41 of the swing maker 4 in the state of maintaining pivotal movement with respect to the rod 1 with the eyelet 13 used as a pivot point. With an increase in the tension of the hook line 8, as shown in FIG. 4(B), the rod 15 passes together with its ring 14 through the guide ring 41 and collides with the hook 6, and when the rod 15 is further drawn, it pivots downward to the right with the eyelet 13 as a pivot point and comes right under the hook 6. When the drawing of the hook line 8 is stopped at this junction, the righting elasticity of the rod 1 works upon the inward engagement rod 15, to thereby reversely pivot upward to the left with the pivot point as a base point and to bring the hook ring 14 into fitting over the base of the hook 6 to bring about a ready-to-operate state of the fish catcher (FIG. 1). At this time, the swing maker 4 is prevented from swinging downward to the right by the engagement of the float 5 and the engagement edge 42, and the guide ring 41 is maintained in substantially immovable relation with respect to the hook ring 14. Accordingly, if the swing maker 4 is provided integrally with the ring 41 and the edge 42 in such a manner as the ring 41 and the edge 42 are maintained in proper position, the hook ring 14 is stable with respect to the guide ring 41 to make the catcher sink smoothly. Also, when the bent rod 1 is kept slidable (not fixed) with respect to the center rod 2 through the eyelet 11, bending of the bent rod 1 by drawing of the hook line 8 elastically bend the bent rod 1 along its overall length, resulting that resilient drawing up of the hook line 8 in time of release of the elastic engagement is very effectively carried out. This, however, does not constitute an important part of the invention and it should be understood that fixing of the bent rod 1 to the center rod 2 at the point corresponding to the eyelet 11 does not deprive the invention of its function.

Before the catcher of the invention is sunk under the water with the catcher maintained in a ready-to-operate state, application of external force to the inward engagement rod 15 in the direction of the hook ring 14 being disengaged from the hook 6 (such force as that produced by collision of the catcher with the water surface, rocks and reefs or by underwater current) makes the rod 15 push the guide ring 41 downward to the right in the drawings, but the float 5 is increased in engaging force with respect to the engagement edge 42 to thereby prevent the swing maker 4 from swinging downward to the right in the drawing, resulting that the hook ring 14 is protected against slipping out of the hook 6.

Figure 3:
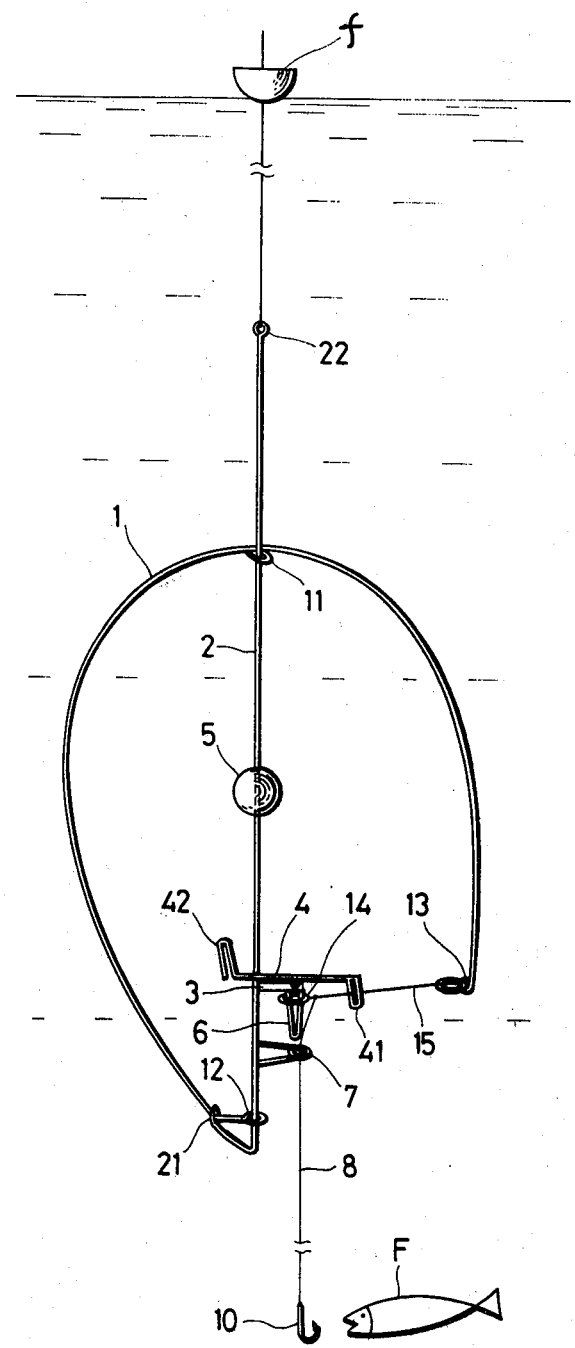
FIG. 3 is a front view showing the fish catcher of the invention set under the water.
Figure 4C:
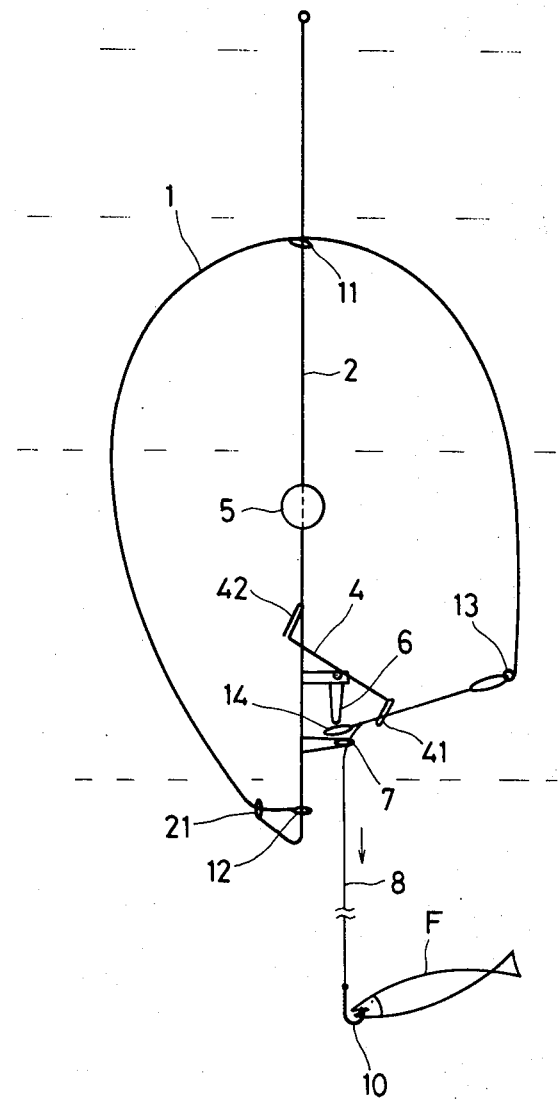
Figure 4D:
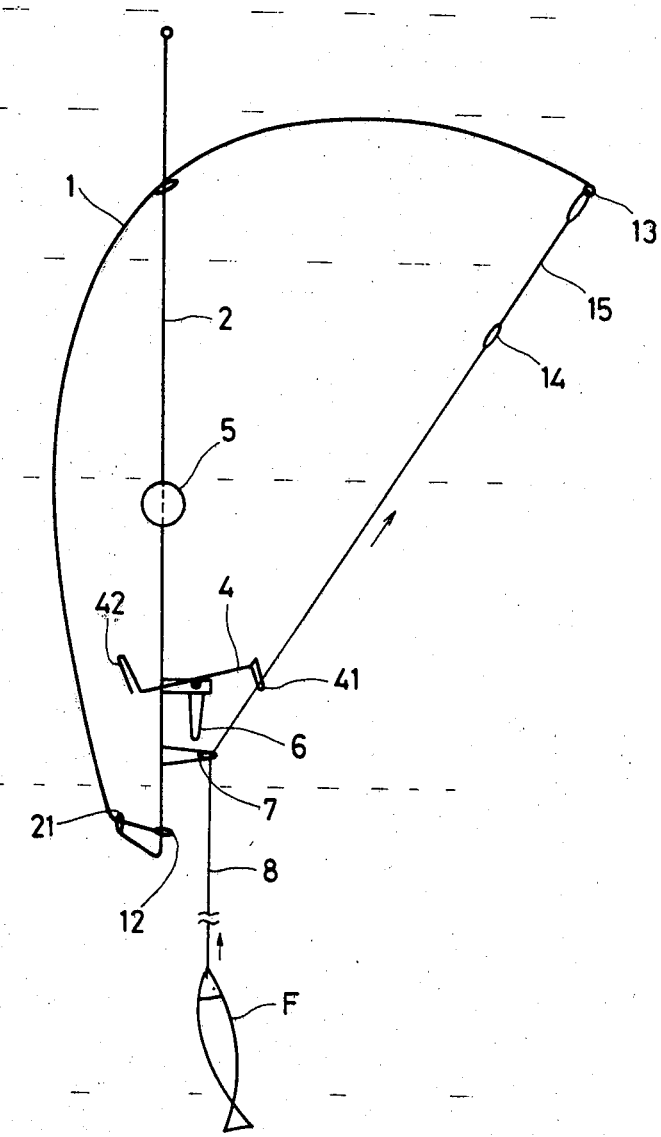

However, when the catcher is sunk under the water and subjected to the buoyancy of the water, the float 5 is moved upward along the center rod 2 and is disengaged from the edge 42 (FIG. 3). Accordingly, if the hook line 8 is pulled downward by a jerk of a fish in this state of the float having been released, the inward rod 15 is pivoted downward with the eyelet 13 as a pivot point, and presses the guide ring 41 downward on the way and swings the swing maker 4 downward to the right to detach the hook ring 14 from the hook 6 (FIG. 4C), and at this moment the hook line 8 is instantly raised right above by the righting elasticity of the bent rod 1 and hooks the mouth or its adjacent parts of a fish, thus making it possible to catch the fish unfailingly (FIG. 4D). Whenever, therefore, the fish F at this time has a bait (not shown) in its mouth or is in the act of snapping at the bait or in the preliminary act of snapping at the bait, the hook 10 is struck into the mouth and its adjacent parts of the fish F and hooks the mouth and in consequence there is no chance of the hook 10 being swallowed by the fish F. The inward ring 7 illustrated in the embodiment serves as a guide to draw the hook line 8 directly upward at time of the disengagement of the hook ring 14 from the hook 6, and this is because the inward ring 7 is provided on the rod 2 and the resilience of legs of the rod 1 opening is not directly applied to the ring 7. This state of hooking is visible either through a float (not shown) at a suitable point of the fishing line 9 or ascertained through the sense of touch which an angler feels at the end of his fishing rod, so that the angler is enabled to draw up the fishing rod and catch a fish with ease. Release of the elastic engagement makes the catcher of the invention being about the state shown in FIG. 5 and the catcher is brought onto the land as it is in the state thus brought about and enters the next step of fishing operation. In this case, where there is not buoyancy, the float 5 slides down along the center rod 2 to push the engagement edge 42 of the swing maker 4 downward to the left in the drawings and sit on the swing maker 4, and hence setting for subsequent fishing is very easy.

As will have been understood from the description given above, the present invention provides great advantages that the invention requires no troublesome manipulation by fingers or visual ascertainment in engagement of the hook ring with the hook but renders it possible to make blind elastic engagement, elastic engagement of the hook ring with the hook is not released indiscriminately where there is no buoyancy but the elastic engagement is very delicately responsive to the force to draw the hook line downward in the water where there is no buoyancy and that accordingly the invention is highly effective in solving the problems related to the previous invention A and can enhance the anglers joy by the increased number of fishes they catch, ease of setting the catcher, positive locking function of setting the catcher before the catcher is put under the water and is also adaptable for use in surf-fishing.

In addition, since the use of the fish catcher of the present invention renders it unnecessary for the angler to coordinate his fishing line in the movement of a float, but when the fishing line is lowered by the disengagement of the resiliently engaged catcher elements under the water, upward drawing of the hook line is vertically decreased to the amount of the fishing line lowered. Accordingly, the use of float is recommended to prevent such lowering and when it is used, preferably a float having a high buoyance as shown in FIG. 3 is more favorable. In the structure shown, the bracket 3, swing maker 4, hook 6, inward ring 7, inward engagement rod 15 and hook ring 14, except the bent rod 1 and center rod 2, may be made of a plastic material, as the case may be. Furthermore, the bracket 3 and hook 6 may be made integrally of a plastic material.

What is claimed is:

1. A fish catcher comprising:
   an elastic bent rod;
   a center rod mounted on said bent rod and connected to said bent rod at its lower end;
   an inward engagement rod pivotally connected to the other end of said bent rod, said engagement rod having a hook ring at its end;
   a bracket extending from said center rod secured to said engagement rod;
   a swing maker swingably provided on said bracket, said swing maker having a guide ring at its end engaged with said engagement rod and an engagement edge at the other end thereof;
   a hook provided downwardly on said bracket;
   an inward ring formed directly below said hook on said center rod;
   a float provided loosely around said center rod; and
   a hook line connected to said inward engagement rod which passes through said inward ring.

2. A fish catcher according to claim 1, wherein said center rod is slidably mounted in substantially the middle of said bent rod.

3. A fish catcher according to claim 2, wherein said center rod is fixedly mounted in substantially the middle of said bent rod.

4. A fish catcher according to claim 1 or 2, wherein said center rod is loosely connected to said bent rod through an eyelet formed in said bent rod.

5. A fish catcher according to claim 1, 2 or 3 wherein said center rod is connected to fishing line above a connection with said bent rod.

* * * * *